(12) United States Patent
Badaroglu et al.

(10) Patent No.: US 12,524,372 B2
(45) Date of Patent: Jan. 13, 2026

(54) FOLDING COLUMN ADDER ARCHITECTURE FOR DIGITAL COMPUTE IN MEMORY

(71) Applicant: QUALCOMM Incorporated, San Diego, CA (US)

(72) Inventors: Mustafa Badaroglu, Flemish Brabant (BE); Zhongze Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1200 days.

(21) Appl. No.: 17/391,718

(22) Filed: Aug. 2, 2021

(65) Prior Publication Data

US 2023/0031841 A1 Feb. 2, 2023

(51) Int. Cl.
*G06F 15/78* (2006.01)
*G06F 7/544* (2006.01)

(52) U.S. Cl.
CPC ........ *G06F 15/7821* (2013.01); *G06F 7/5443* (2013.01)

(58) Field of Classification Search
CPC .... G06F 7/5443; G06F 17/16; G06F 15/7821; G06G 17/16
See application file for complete search history.

(56) References Cited

U.S. PATENT DOCUMENTS

| | | | | |
|---|---|---|---|---|
| 11,221,827 B1 * | 1/2022 | Hsu | ........................ | G06N 3/063 |
| 2019/0205741 A1 | 7/2019 | Gupta et al. | | |
| 2020/0150923 A1 * | 5/2020 | Muralimanohar | .... | G06F 7/5443 |
| 2020/0349106 A1 | 11/2020 | Ovsiannikov | | |
| 2021/0397974 A1 * | 12/2021 | Hoang | .................... | G06N 3/063 |
| 2022/0244916 A1 * | 8/2022 | Lee | ........................ | G06F 7/5443 |
| 2022/0392524 A1 * | 12/2022 | Chen | ........................ | G06N 3/063 |
| 2023/0047364 A1 * | 2/2023 | Badaroglu | ............. | G06N 3/063 |
| 2023/0115373 A1 * | 4/2023 | Badaroglu | ............... | G06N 3/09 |
| | | | | 708/670 |

OTHER PUBLICATIONS

Chih Y-D., et al., "16.4 An 89TOPS/W and 16.3TOPS/mm2 All-Digital SRAM-Based Full-Precision Compute-In Memory Macro in 22nm for Machine-Learning Edge Applications", 2021 IEEE International Solid-State Circuits Conference (ISSCC), Session 16, Computation in Memory, Feb. 17, 2021, 3 pages.

(Continued)

*Primary Examiner* — Matthew D Sandifer
(74) *Attorney, Agent, or Firm* — Patterson +Sheridan LLP

(57) ABSTRACT

Certain aspects provide an apparatus for performing machine learning tasks, and in particular, to computation-in-memory architectures. One aspect provides a circuit for in-memory computation. The circuit generally includes: a plurality of memory cells on each of multiple columns of a memory, the plurality of memory cells being configured to store multiple bits representing weights of a neural network, wherein the plurality of memory cells on each of the multiple columns are on different word-lines of the memory; multiple addition circuits, each coupled to a respective one of the multiple columns; a first adder circuit coupled to outputs of at least two of the multiple addition circuits; and an accumulator coupled to an output of the first adder circuit.

28 Claims, 13 Drawing Sheets

(56) References Cited

OTHER PUBLICATIONS

Kang M., et al., "Deep In-Memory Architectures in SRAM: An Analog Approach to Approximate Computing", Proceedings of the IEEE, vol. 108, No. 12, Dec. 2020, pp. 2251-2275.
Wang J., et al., "14.2 A Compute SRAM with Bit-Serial Integer/Floating-Point Operations for Programmable In-Memory Vector Acceleration", 2019 IEEE International Solid-State Circuits Conference (ISSCC), Session 14, Machine Learning & Digital LDO Circuits, Feb. 19, 2019, 3 pages.
International Search Report and Written Opinion—PCT/US2022/073856—ISA/EPO—Nov. 4, 2022.

\* cited by examiner

900 ──▶

```
┌─────────────────────────────────────────────────────┐
│ ADD, VIA EACH OF MULTIPLE ADDITION CIRCUITS, OUTPUT │
│ SIGNALS ON A RESPECTIVE ONE OF MULTIPLE COLUMNS OF A│
│ MEMORY, WHEREIN A PLURALITY OF MEMORY CELLS ARE ON  │── 905
│   EACH OF THE MULTIPLE COLUMNS, THE PLURALITY OF    │
│   MEMORY CELLS STORING MULTIPLE BITS REPRESENTING   │
│ WEIGHTS OF A NEURAL NETWORK, WHEREIN THE PLURALITY  │
│  OF MEMORY CELLS ON EACH OF THE MULTIPLE COLUMNS    │
│     ARE ON DIFFERENT WORD-LINES OF THE MEMORY       │
└─────────────────────────────────────────────────────┘
                          │
                          ▼
┌─────────────────────────────────────────────────────┐
│  ADD, VIA A FIRST ADDER CIRCUIT, OUTPUT SIGNALS OF AT│── 910
│     LEAST TWO OF THE MULTIPLE ADDITION CIRCUITS      │
└─────────────────────────────────────────────────────┘
                          │
                          ▼
┌─────────────────────────────────────────────────────┐
│  ACCUMULATE, VIA AN ACCUMULATOR, OUTPUT SIGNALS OF  │── 915
│              THE FIRST ADDER CIRCUIT                │
└─────────────────────────────────────────────────────┘
```

*FIG. 9*

FOLDING COLUMN ADDER ARCHITECTURE FOR DIGITAL COMPUTE IN MEMORY

INTRODUCTION

Aspects of the present disclosure relate to performing machine learning tasks, and in particular, to computation-in-memory architectures.

Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data.

As the use of machine learning has proliferated for enabling various machine learning (or artificial intelligence) tasks, the need for more efficient processing of machine learning model data has arisen. In some cases, dedicated hardware, such as machine learning accelerators, may be used to enhance a processing system's capacity to process machine learning model data. However, such hardware demands space and power, which is not always available on the processing device. For example, "edge processing" devices, such as mobile devices, always-on devices, Internet of Things (IoT) devices, and the like, typically have to balance processing capabilities with power and packaging constraints. Further, accelerators may move data across common data busses, which can cause significant power usage and introduce latency into other processes sharing the data bus. Consequently, other aspects of a processing system are being considered for processing machine learning model data.

Memory devices are one example of another aspect of a processing system that may be leveraged for performing processing of machine learning model data through so-called computation-in-memory (CIM) processes. Conventional CIM processes perform computation using analog signals, which may result in inaccuracy of computation results, adversely impacting neural network computations. Accordingly, systems and methods are needed for performing computation-in-memory with increased accuracy.

BRIEF SUMMARY

Certain aspects provide apparatus and techniques for performing machine learning tasks, and in particular, to computation-in-memory architectures.

One aspects provides a circuit for in-memory computation. The circuit generally includes: a plurality of memory cells on each of multiple columns of a memory, the plurality of memory cells being configured to store multiple bits representing weights of a neural network, wherein the plurality of memory cells on each of the multiple columns are on different word-lines of the memory; multiple addition circuits, each coupled to a respective one of the multiple columns; a first adder circuit coupled to outputs of at least two of the multiple addition circuits; and an accumulator coupled to an output of the first adder circuit.

One aspect provides a method for in-memory computation. The method generally includes: adding, via each of multiple addition circuits, output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory; adding, via a first adder circuit, output signals of at least two of the multiple addition circuits; and accumulating, via an accumulator, output signals of the first adder circuit.

One aspect provides an apparatus for in-memory computation. The apparatus generally includes: first means for adding output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory; second means for adding output signals of at least two of the first means for adding; and means for accumulating output signals of the second means for adding.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 is a flow diagram illustrating example operations for in-memory computation, in accordance with certain aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1A:
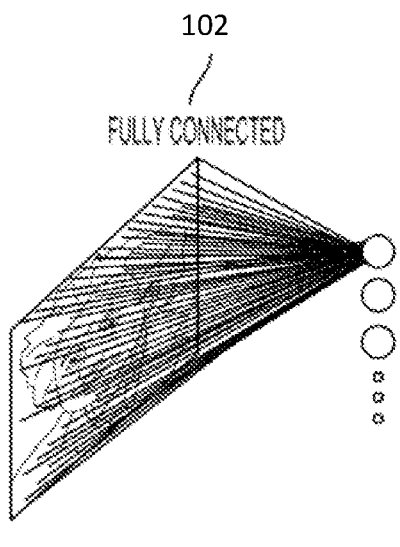
FIGS. 1A-1D depict examples of various types of neural networks, which may be implemented by aspects of the present disclosure.

Aspects of the present disclosure provide apparatuses, methods, processing systems, and computer-readable mediums for performing computation in memory (CIM) to handle data-intensive processing, such as implementing machine learning models. Some aspects provide techniques for performing digital CIM using addition circuits, each addition circuit adding (e.g., accumulating) output signals on a respective one of multiple columns of memory after multiple computation cycles. As used herein, an "addition circuit" generally refers to any circuit that adds (or accumulates across sequential computation cycles) output signals of memory cells on a column. In some cases, the addition circuit may be an accumulator. An accumulator generally refers to circuitry used to accumulate output signals across multiple cycles. In other cases, the addition circuit may be an adder tree. An "adder circuit" or "an adder tree" generally refers to digital adders used to add outputs signals of multiple memory cells (e.g., memory cells across word-lines or columns). An example implementation of an adder circuit is described herein with respect to FIG. 5B, and an example implementation of an accumulator is described herein with respect to FIG. 5C. An addition circuit may be implemented as an adder tree having multiple adder circuits, or an accumulator. In some aspects, word-lines of CIM circuitry are sequentially activated, and accumulators concurrently perform accumulation, to provide an accumulation result after two or more of the word-lines are sequentially activated.

Certain aspects provide a folding architecture that allows configurability of the bit-size of weights used for computation. For example, one or more processing paths (also referred to as "wings") of the CIM architecture may be disabled to adjust the bit-size of the weights being used. For instance, eight processing paths (e.g., including columns and associated processing circuitry) may be used to implement eight-bit weights, or four processing paths may be used (with the other four processing paths temporarily disabled) to implement four-bit weights.

CIM-based machine learning (ML)/artificial intelligence (AI) may be used for a wide variety of tasks, including image and audio processing and making wireless communication decisions (e.g., to optimize, or at least increase, throughput and signal quality). Further, CIM may be based on various types of memory architectures, such as dynamic random-access memory (DRAM), static random-access memory (SRAM) (e.g., based on an SRAM cell as in FIG. 4), magnetoresistive random-access memory (MRAM), and resistive random-access memory (ReRAM or RRAM), and may be attached to various types of processing units, including central processing units (CPUs), digital signal processors (DSPs), graphics processing units (GPUs), field-programmable gate arrays (FPGAs), AI accelerators, and others. Generally, CIM may beneficially reduce the "memory wall" problem, which is where the movement of data in and out of memory consumes more power than the computation of the data. Thus, by performing the computation in memory, significant power savings may be realized. This is particularly useful for various types of electronic devices, such as lower power edge processing devices, mobile devices, and the like.

For example, a mobile device may include a memory device configured for storing data and performing compute-in-memory operations. The mobile device may be configured to perform an ML/AI operation based on data generated by the mobile device, such as image data generated by a camera sensor of the mobile device. A memory controller unit (MCU) of the mobile device may thus load weights from another on-board memory (e.g., flash or RAM) into a CIM array of the memory device and allocate input feature buffers and output (e.g., output activation) buffers. The processing device may then commence processing of the image data by loading, for example, a layer in the input buffer and processing the layer with weights loaded into the CIM array. This processing may be repeated for each layer of the image data, and the outputs (e.g., output activations) may be stored in the output buffers and then used by the mobile device for an ML/AI task, such as facial recognition.

Brief Background on Neural Networks, Deep Neural Networks, and Deep Learning Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Layer Connectivity in Neural Networks

Neural networks, such as deep neural networks (DNNs), may be designed with a variety of connectivity patterns between layers.

FIG. 1A illustrates an example of a fully connected neural network 102. In a fully connected neural network 102, each node in a first layer communicates its output to every node in a second layer, so that each node in the second layer will receive input from every node in the first layer.

Figure 1B:
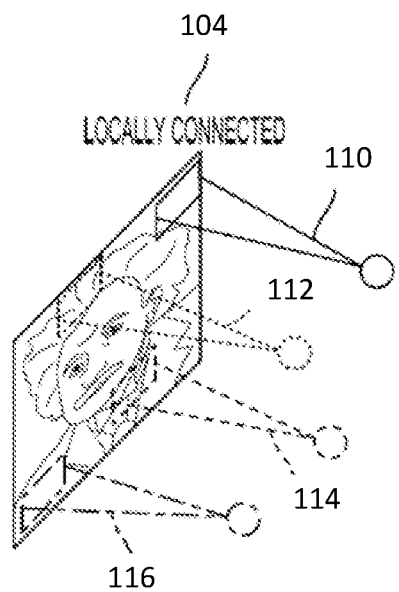

FIG. 1B illustrates an example of a locally connected neural network 104. In a locally connected neural network 104, a node in a first layer may be connected to a limited number of nodes in the second layer. More generally, a locally connected layer of the locally connected neural network 104 may be configured so that each node in a layer will have the same or a similar connectivity pattern, but with connection strengths (or weights) that may have different values (e.g., values associated with local areas 110, 112, 114, and 116 of the first layer nodes). The locally connected connectivity pattern may give rise to spatially distinct receptive fields in a higher layer, because the higher layer nodes in a given region may receive inputs that are tuned through training to the properties of a restricted portion of the total input to the network.

Figure 1C:
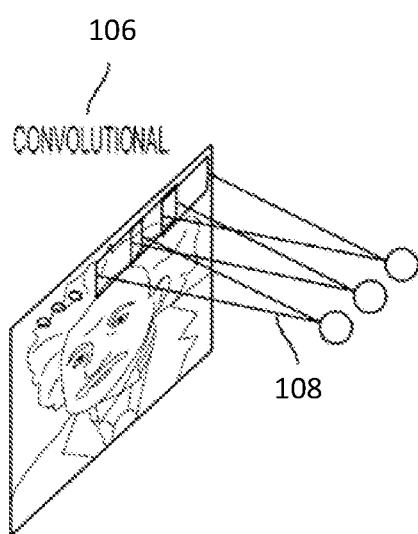

One type of locally connected neural network is a convolutional neural network (CNN). FIG. 1C illustrates an example of a convolutional neural network 106. The convolutional neural network 106 may be configured such that the connection strengths associated with the inputs for each node in the second layer are shared (e.g., for local area 108 overlapping another local area of the first layer nodes). Convolutional neural networks are well suited to problems in which the spatial locations of inputs are meaningful.

One type of convolutional neural network is a deep convolutional network (DCN). Deep convolutional networks are networks of multiple convolutional layers, which may further be configured with, for example, pooling and normalization layers.

Figure 1D:
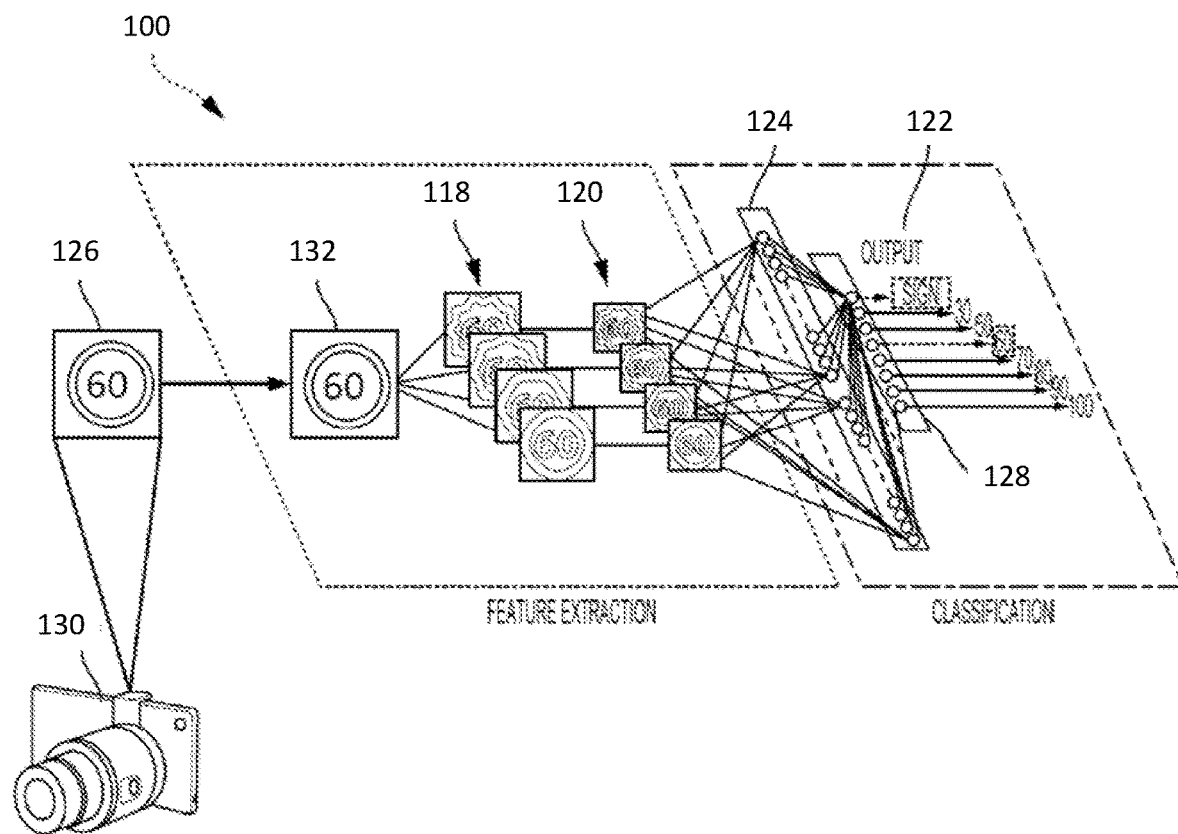

FIG. 1D illustrates an example of a DCN 100 designed to recognize visual features in an image 126 generated by an image-capturing device 130. For example, if the image-capturing device 130 is a camera mounted in or on (or otherwise moving along with) a vehicle, then the DCN 100 may be trained with various supervised learning techniques to identify a traffic sign and even a number on the traffic sign. The DCN 100 may likewise be trained for other tasks, such as identifying lane markings or identifying traffic lights. These are just some example tasks, and many others are possible.

In the example of FIG. 1D, the DCN 100 includes a feature-extraction section and a classification section. Upon receiving the image 126, a convolutional layer 132 applies convolutional kernels (for example, as depicted and described in FIG. 2) to the image 126 to generate a first set of feature maps (or intermediate activations) 118. Generally, a "kernel" or "filter" comprises a multidimensional array of weights designed to emphasize different aspects of an input data channel. In various examples, "kernel" and "filter" may be used interchangeably to refer to sets of weights applied in a convolutional neural network.

The first set of feature maps 118 may then be subsampled by a pooling layer (e.g., a max pooling layer, not shown) to generate a second set of feature maps 120. The pooling layer may reduce the size of the first set of feature maps 118 while maintaining much of the information in order to improve model performance. For example, the second set of feature maps 120 may be downsampled to a 14×14 matrix from a 28×28 matrix by the pooling layer.

This process may be repeated through many layers. In other words, the second set of feature maps 120 may be further convolved via one or more subsequent convolutional layers (not shown) to generate one or more subsequent sets of feature maps (not shown).

In the example of FIG. 1D, the second set of feature maps 120 is provided to a fully connected layer 124, which in turn generates an output feature vector 128. Each feature of the output feature vector 128 may include a number that corresponds to a possible feature of the image 126, such as "sign," "60," and "100." In some cases, a softmax function (not shown) may convert the numbers in the output feature vector 128 to a probability. In such cases, an output 122 of the DCN 100 is a probability of the image 126 including one or more features.

A softmax function (not shown) may convert the individual elements of the output feature vector 128 into a probability in order that an output 122 of DCN 100 is one or more probabilities of the image 126 including one or more features, such as a sign with the number "60" thereon, as in image 126. Thus, in the present example, the probabilities in the output 122 for "sign" and "60" should be higher than the probabilities of the other elements of the output 122, such as "30," "40," "50," "70," "80," "90," and "100."

Before training the DCN 100, the output 122 produced by the DCN 100 may be incorrect. Thus, an error may be calculated between the output 122 and a target output known a priori. For example, here the target output is an indication that the image 126 includes a "sign" and the number "60." Utilizing the known target output, the weights of the DCN 100 may then be adjusted through training so that a subsequent output 122 of the DCN 100 achieves the target output (with high probabilities).

To adjust the weights of the DCN 100, a learning algorithm may compute a gradient vector for the weights. The gradient vector may indicate an amount that an error would increase or decrease if a weight were adjusted in a particular way. The weights may then be adjusted to reduce the error. This manner of adjusting the weights may be referred to as "backpropagation" because this adjustment process involves a "backward pass" through the layers of the DCN 100.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After training, the DCN 100 may be presented with new images, and the DCN 100 may generate inferences, such as classifications, or probabilities of various features being in the new image.

Convolution Techniques for Convolutional Neural Networks

Convolution is generally used to extract useful features from an input data set. For example, in convolutional neural networks, such as described above, convolution enables the extraction of different features using kernels and/or filters whose weights are automatically learned during training. The extracted features are then combined to make inferences.

An activation function may be applied before and/or after each layer of a convolutional neural network. Activation functions are generally mathematical functions that determine the output of a node of a neural network. Thus, the activation function determines whether a node should pass information or not, based on whether the node's input is relevant to the model's prediction. In one example, where y=conv(x) (i.e., y is the convolution of x), both x and y may be generally considered as "activations." However, in terms of a particular convolution operation, x may also be referred to as "pre-activations" or "input activations" as x exists before the particular convolution, and y may be referred to as output activations or a feature map.

Figure 2:
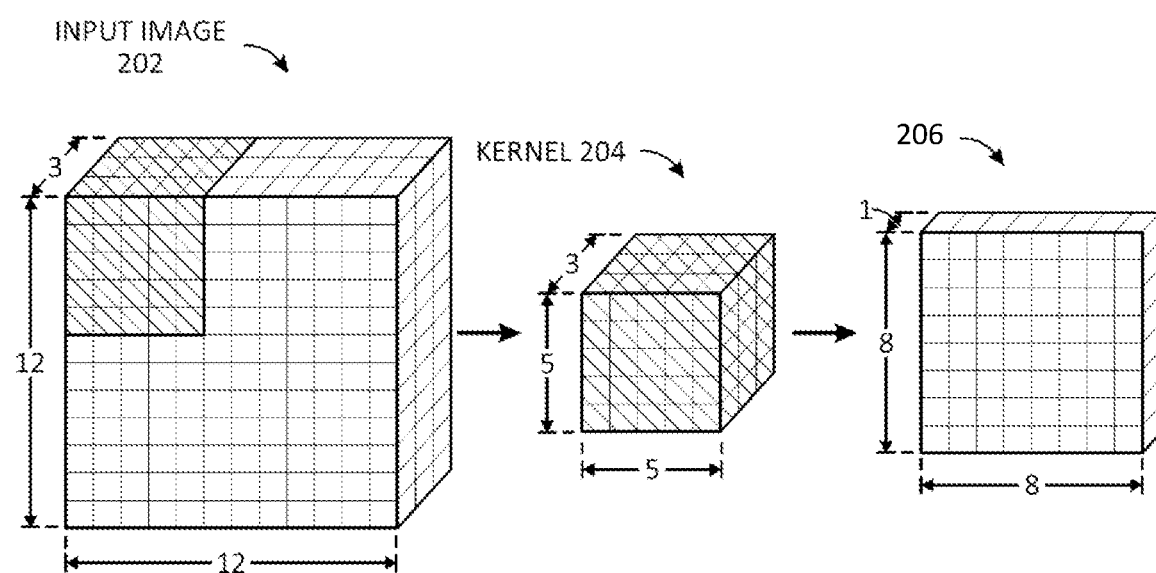
FIG. 2 depicts an example of a traditional convolution operation, which may be implemented by aspects of the present disclosure.

FIG. 2 depicts an example of a traditional convolution in which a 12-pixel×12-pixel×3-channel input image is convolved using a 5×5×3 convolution kernel 204 and a stride (or step size) of 1. The resulting feature map 206 is 8 pixels×8 pixels×1 channel. As seen in this example, the traditional convolution may change the dimensionality of the input data as compared to the output data (here, from 12×12 to 8×8 pixels), including the channel dimensionality (here, from 3 channels to 1 channel).

Figure 3A:
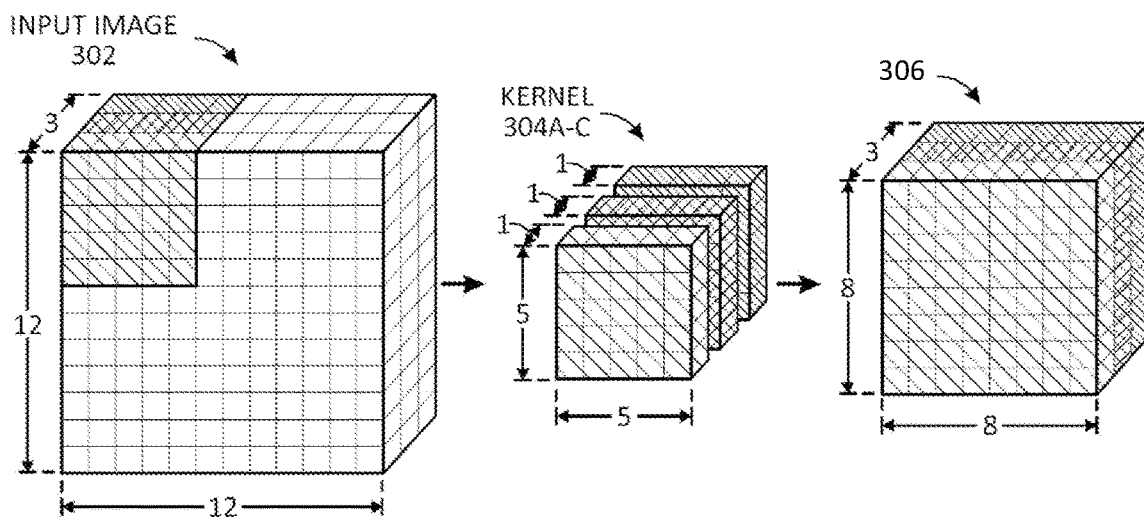
FIGS. 3A and 3B depict examples of depthwise separable convolution operations, which may be implemented by aspects of the present disclosure.
Figure 3B:
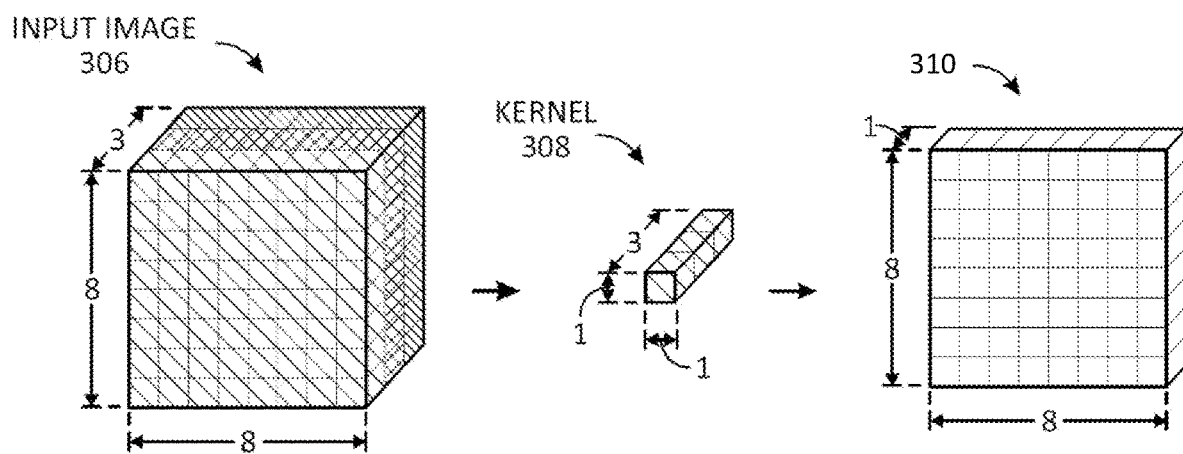

One way to reduce the computational burden (e.g., measured in floating-point operations per second (FLOPs)) and the number of parameters associated with a neural network comprising convolutional layers is to factorize the convolutional layers. For example, a spatial separable convolution, such as depicted in FIG. 2, may be factorized into two components: (1) a depthwise convolution, where each spatial channel is convolved independently by a depthwise convolution (e.g., a spatial fusion); and (2) a pointwise convolution, where all the spatial channels are linearly combined (e.g., a channel fusion). An example of a depthwise separable convolution is depicted in FIGS. 3A and 3B. Generally, during spatial fusion, a network learns features from the spatial planes, and during channel fusion, the network learns relations between these features across channels.

In one example, a depthwise separable convolution may be implemented using 5×5 kernels for spatial fusion, and 1×1 kernels for channel fusion. In particular, the channel fusion may use a 1×1×d kernel that iterates through every single point in an input image of depth d, where the depth d of the kernel generally matches the number of channels of the input image. Channel fusion via pointwise convolution is useful for dimensionality reduction for efficient computations. Applying 1×1×d kernels and adding an activation layer after the kernel may give a network added depth, which may increase the network's performance.

In particular, in FIG. 3A, the 12-pixel×12-pixel×3-channel input image 302 is convolved with a filter comprising three separate kernels 304A-C, each having a 5×5×1 dimensionality, to generate a feature map 306 of 8 pixels×8 pixels×3 channels, where each channel is generated by an individual kernel among kernels 304A-C.

Then, feature map 306 is further convolved using a pointwise convolution operation with a kernel 308 having dimensionality 1×1×3 to generate a feature map 310 of 8 pixels×8 pixels×1 channel. As is depicted in this example, feature map 310 has reduced dimensionality (1 channel versus 3 channels), which allows for more efficient computations therewith.

Though the result of the depthwise separable convolution in FIGS. 3A and 3B is substantially similar to the traditional convolution in FIG. 2, the number of computations is significantly reduced, and thus depthwise separable convolution offers a significant efficiency gain where a network design allows it.

Though not depicted in FIG. 3B, multiple (e.g., m) pointwise convolution kernels 308 (e.g., individual components of a filter) can be used to increase the channel dimensionality of the convolution output. So, for example, m=256 1×1×3 kernels 308 can be generated, in which each output is an 8-pixel×8-pixel×1-channel feature map (e.g., feature map 310), and these feature maps can be stacked to get a resulting feature map of 8 pixels×8 pixels×256 channels. The resulting increase in channel dimensionality provides more parameters for training, which may improve a convolutional neural network's ability to identify features (e.g., in input image 302).

Example Compute-in-Memory (CIM) Architecture

Figure 4:
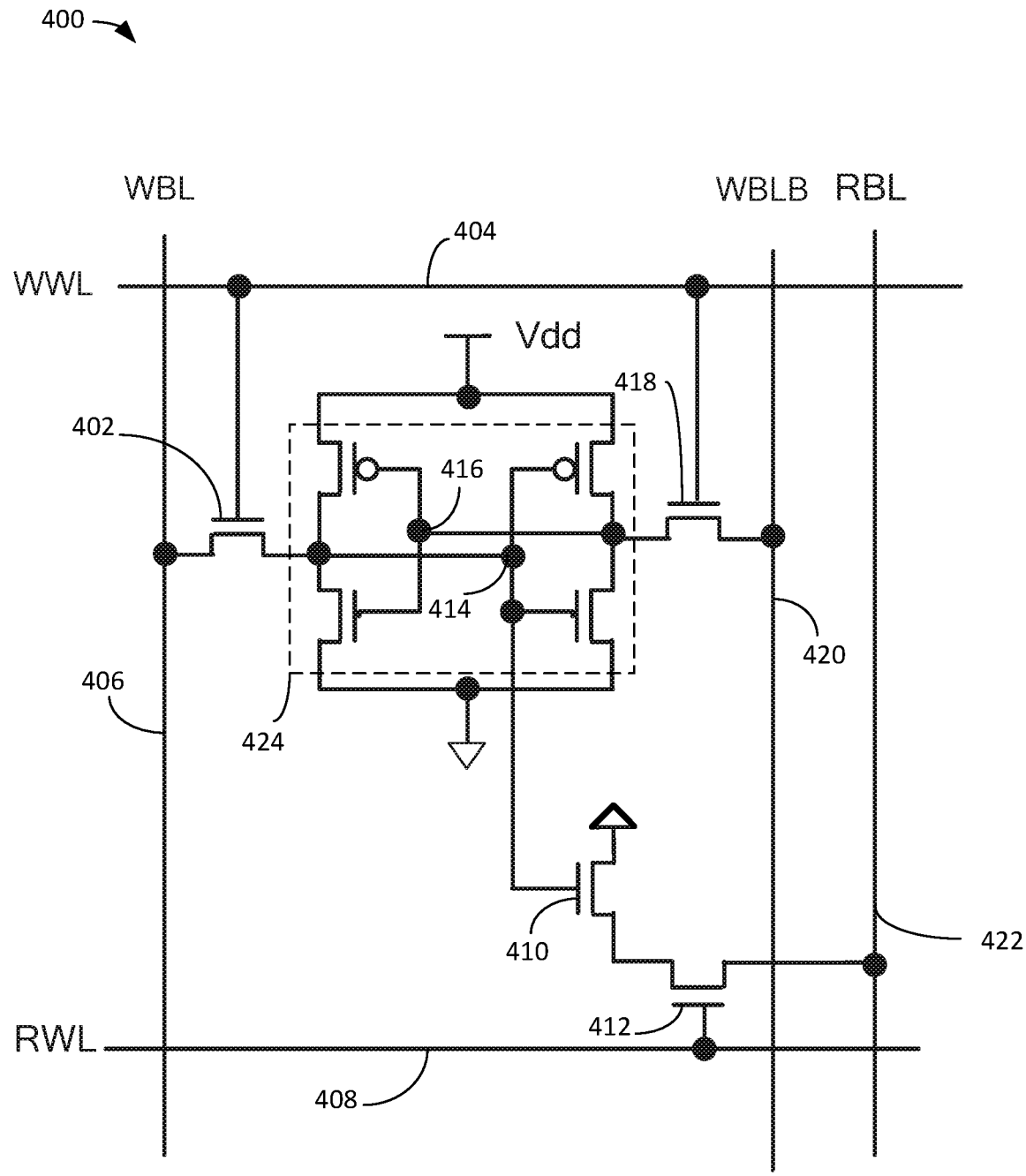
FIG. 4 illustrates an example memory cell implemented as an eight-transistor (8T) static random access memory (SRAM) cell for a compute-in-memory (CIM) circuit.

FIG. 4 illustrates an example memory cell 400 of a static random access memory (SRAM), which may be implemented in a CIM array. The memory cell 400 may be referred to as an 8-transistor (8T) SRAM cell as the memory cell 400 is implemented with eight transistors.

As shown, the memory cell 400 may include a cross-coupled invertor pair 424 having an output 414 and an output 416. As shown, the cross-coupled invertor pair output 414 is selectively coupled to a write bit-line (WBL) 406 via a pass-gate transistor 402, and the cross-coupled invertor pair output 416 is selectively coupled to a complementary write bit-line (WBLB) 420 via a pass-gate transistor 418. The WBL 406 and WBLB 420 are configured to provide complementary digital signals to be written (e.g., stored) in the cross-coupled invertor pair 424. The WBL and WBLB may be used to store a bit for a neural network weight in the memory cell 400. The gates of pass-gate transistors 402, 418 may be coupled to a write word-line (WWL) 404, as shown. For example, a digital signal to be written may be provided to the WBL (and a complement of the digital signal is provided to the WBLB). The pass-gate transistors 402, 418—which are implemented here as n-type field-effect transistors (NFETs)—are then turned on by providing a logic high signal to WWL 404, resulting in the digital signal being stored in the cross-coupled invertor pair 424.

As shown, the cross-coupled invertor pair output 414 may be coupled to a gate of a transistor 410. The source of the transistor 410 may be coupled to a reference potential node (VSS or electrical ground), and the drain of the transistor 410 may be coupled to a source of a transistor 412. The drain of the transistor 412 may be coupled to a read bit-line (RBL) 422, as shown. The gate of transistor 412 may be controlled via a read word-line (RWL) 408. The RWL 408 may be controlled via an activation input signal.

During a read cycle, the RBL 422 may be precharged to logic high. If both the activation input and the weight bit stored at the cross-coupled invertor pair output 414 are logic high, then transistors 410, 412 are both turned on, electrically coupling the RBL 422 to VSS at the source of transistor 410 and discharging the RBL 422 to logic low. If either the activation input or the weight stored at the cross-coupled invertor pair output 414 is logic low, then at least one of transistors 410, 412 will be turned off, such that the RBL 422 remains logic high. Thus, the output of the memory cell 400 at RBL 422 is logic low only when both the weight bit and activation input are logic high, and is logic high otherwise, effectively implementing a NAND-gate operation.

Figure 5A:
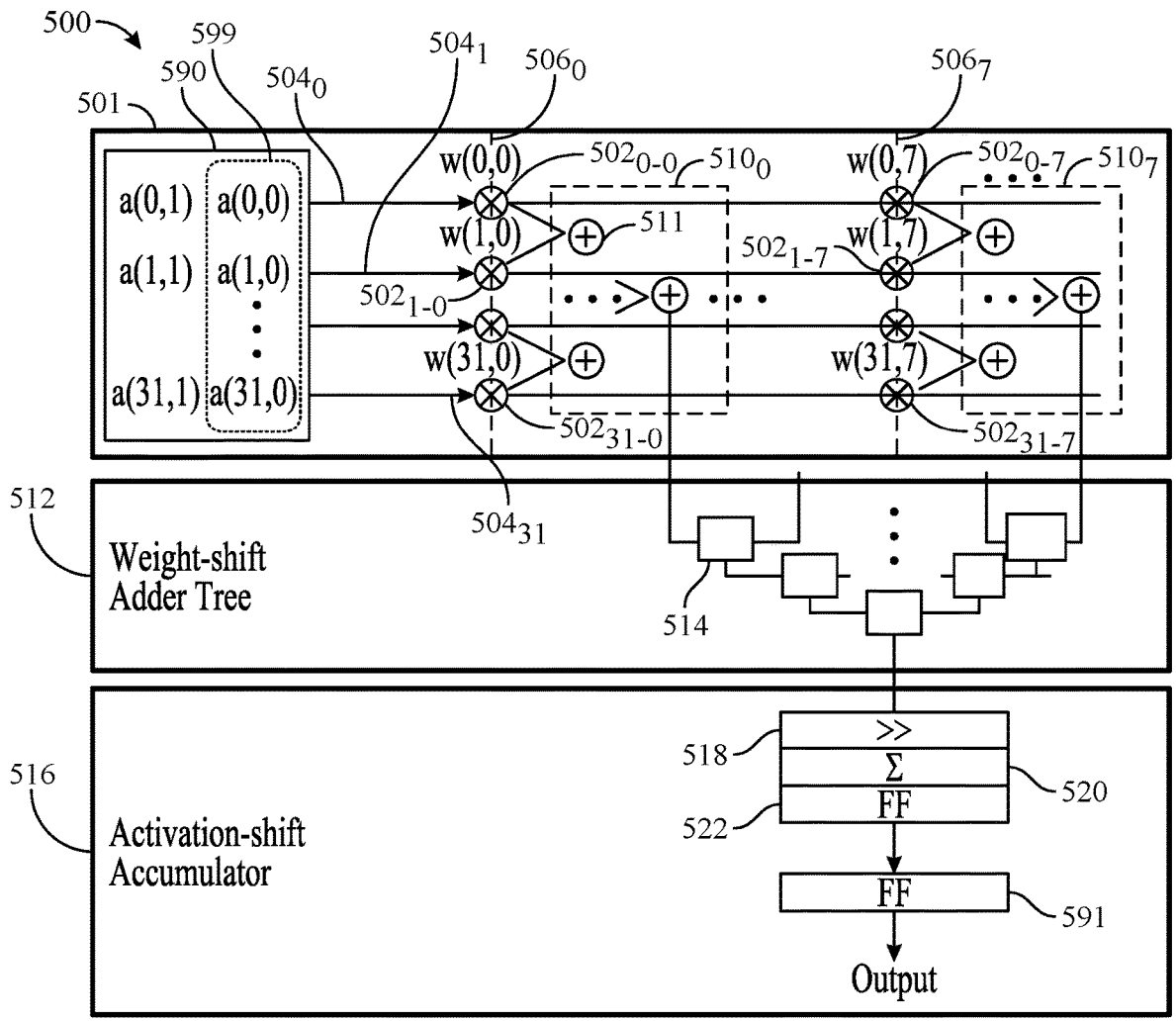
FIG. 5A illustrates a circuit for CIM, in accordance with certain aspects of the present disclosure.

FIG. 5A illustrates a circuit 500 for CIM, in accordance with certain aspects of the present disclosure. The circuit 500 includes a CIM array 501 having word-lines $504_0$ to $504_{31}$ (also referred to as rows) and columns $506_0$ to $506_7$. Word-lines $504_0$ to $504_{31}$ are collectively referred to as word-lines (WLs) 504, and columns $506_0$ to $506_7$ are collectively referred to as columns 506. As shown, the CIM array 501 may include activation circuitry 590 configured to provide activation signals to word-lines 504. While the CIM array 501 is implemented with 32 word-lines and 8 columns to facilitate understanding, the CIM array may be implemented with any number of word-lines or columns. As shown, memory cells $502_{0-0}$ to $502_{31-7}$ (collectively referred to as memory cells 502) are implemented at the intersections of the WLs 504 and columns 506.

Each of the memory cells 502 may be implemented using the memory cell architecture described with respect to FIG. 4. As shown, activation inputs a(0,0) to a(31,0) may be provided to respective word-lines 504, and the memory cells 502 may store neural network weights w(0,0) to w(31,7). For example, memory cells $502_{0-0}$ to $502_{0-7}$ may store weight bits w(0,0) to w(0,7), memory cells $502_{1-0}$ to $502_{1-7}$ may store weight bits w(1,0) to w(1,7), and so on. Each word-line may store a multi-bit weight. For example, weight bits w(0,0) to w(0,7) represent eight bits of a weight of a neural network.

As shown, the circuit 500 may include adder trees $510_0$ to $510_7$ (collectively referred to as adder trees 510), each being implemented for a respective one of the columns 506. Each of the adder trees 510 adds the output signals from the memory cells 502 on the respective one of the columns 506. Each adder tree is implemented using a tree of adder circuits, such as adder circuit 511. The outputs of the adder trees 510 are coupled to a weight-shift adder tree circuit 512, as shown. The weight-shift adder tree circuit 512 includes multiple weight-shift adders (e.g., weight-shift adder 514), each including a bit-shift and add circuit to facilitate the performance of a bit-shift and addition operation. In other words, memory cells on column $506_0$ may store the most significant bits (MSBs) for respective weights, and memory cells on column $506_7$ may store the least significant bits (LSBs) for respective weights. Therefore, when performing the addition across the columns 506, a bit-shift operation is performed to shift the bits to account for the significance of the bits on the associated column.

The output of the weight-shift adder tree circuit 512 is provided to an activation-shift accumulator circuit 516. The activation-shift accumulator circuit 516 includes a bit-shift circuit 518 and an accumulator 520. The activation-shift accumulator circuit 516 may also include a flip-flop (FF) 522 and a FF 591.

During operation of the circuit 500, activation circuitry 590 provides a first set 599 of activation inputs a(0,0) to a(31,0) to the memory cells 502 for computation during a first activation cycle. The first set of activation inputs a(0,0) to a(31,0) represents the most-significant bits of the activation parameters. The outputs of computations on each column are added using a respective one of the adder trees 510. The outputs of the adder trees 510 are added using the weight-shift adder tree circuit 512, the results of which is provided to the activation-shift accumulator. The same operation is performed for other sets of activation inputs during subsequent activation cycles, such as activation inputs a(0,1) to a(31,1) representing the second most-significant bits of the activation parameters, and so on until activation inputs representing the least-significant bits of the activation parameters are processed. The bit-shift circuit 518 performs a bit-shift operation based on the activation cycle. For example, for an 8-bit activation parameter processed using eight activation cycles, the bit-shift circuit may perform an 8-bit shift for the first activation cycle, a 7-bit shift for the second activation cycle, and so on. After the activation cycles, the outputs of the bit-shift circuit 518 are accumulated using the accumulator 520 and stored in the FFs 522, 591, which may be implementing a transfer register.

The architecture of the circuit 500 is referred to as a "folding" architecture due to the symmetrical structure of the processing circuitry, such as the weight-shift adder tree circuit 512. The folding architecture allows configurability of the number of bits associated with weights used during computation. For example, instead of a computation using eight-bit weights, a computation using four-bit weights may be implemented by deactivating four of the columns 506, as described in more detail herein.

The aspects described with respect to FIG. 5A provide bit-wise storage and bit-wise multiplication. The adder trees 510 perform a population count addition for the columns 506. That is, each of the adder trees 510 adds the output signals of memory cells for a column. The weight-shift adder tree circuit 512 (e.g. having three stages as shown for eight columns) combines the weighted sum generated for the eight columns (e.g., providing the accumulation result for a given activation bit position during an activation cycle). The activation-shift accumulator circuit 516 combines the results from multiple (e.g., eight) activation cycles and outputs the final accumulation result. For example, the bit-shift circuit 518 shifts the bits at the output of the weight-shift adder tree circuit 512 based on the associated activation cycle. The serial accumulator 520 accumulates the shifted adder output generated by the bit-shift circuit 518. The transfer register implemented using FFs 522, 591 copies the output of the serial accumulator 520 after the computation for the last activation cycle has been completed.

The parallel addition across columns increases the processing performance (in terms of tera-operations per second (TOPS)) associated with the circuit 500, provides a more compact full-adder cell, reduces parasitic penalties since adders are implemented next to bit-multiplication memory cells, reduces switching activity since fewer rows of the memory has a high activation amplitude as compared to conventional implementations, and provides easy tiling that enables easy macro generation due to the cells being placed side-by-side in abutment configuration for the realization of an adder tree. The aspects described with respect to FIG. 5A may be implemented with a single clock frequency.

The circuit 500 provides linear energy scaling across computations using different bit-sizes of activation or weight parameters. In other words, using the adder trees 510 and weight-shift adder tree circuit 512 provides bit-size configurability, allowing for an n-bit activation with m-bit weight accumulation, n and m being positive integers, as described herein. The energy consumption associated with circuit 500 scales linearly based on the configured bit-size for activation parameters and weights.

Figure 5B:
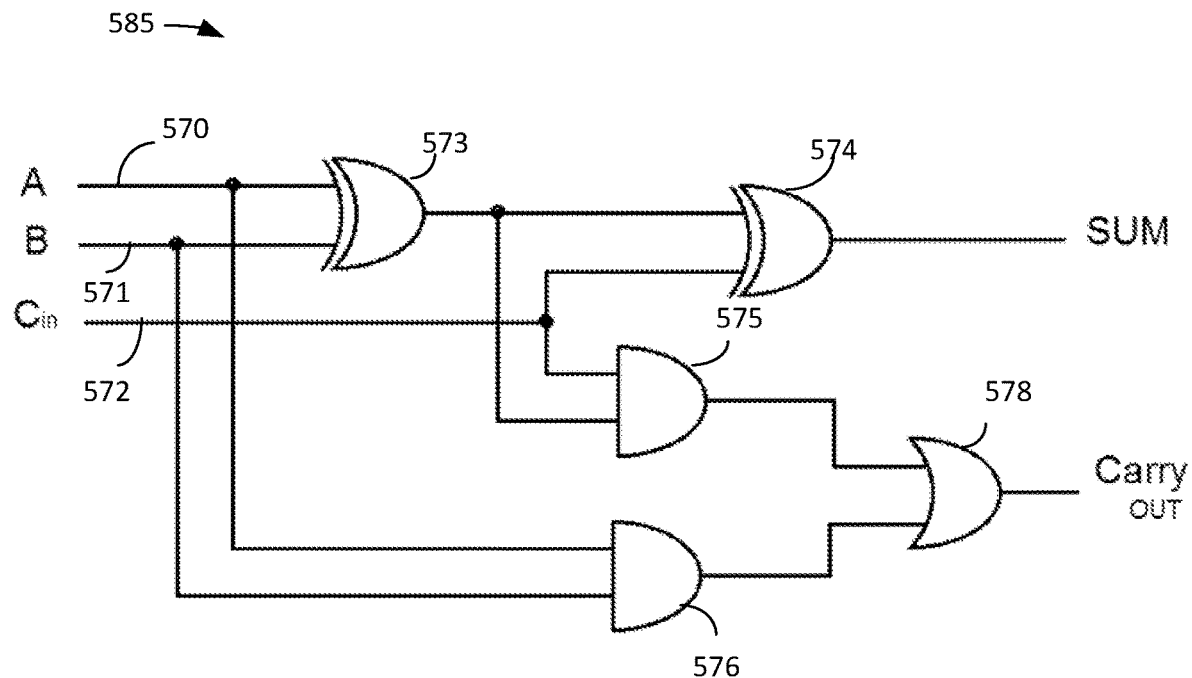
FIG. 5B illustrates an example implementations of an adder circuit.

FIG. 5B illustrates an example implementation of an adder circuit 585 configured to perform an add operation. The adder circuit 585 may correspond to any of adder circuits described herein, such as the adder circuit 511. As shown, the adder circuit includes an exclusive OR (XOR) gate 573 receiving inputs 570, 571 (labeled A and B). The output of the XOR gate 573 is provided to an input of an XOR gate 574, the other input of the XOR gate 574 receiving a carry input (Cin) signal 572. The output of the XOR gate 574 provides the output (labeled SUM) of the adder circuit. As shown, the adder circuit may also include an AND gate 575 receiving the Cin signal 572 and receiving the output of the XOR gate 573. The AND gate 576 receives the inputs 570, 571. The outputs of the AND gates 575, 576 are provided to inputs of an OR gate 578 that generates a carry out signal for the add operation. While FIG. 5B illustrates one example implementation of an adder circuit to facilitate understanding, the aspects described herein may be implemented using any suitable adder circuit architecture.

Figure 5C:
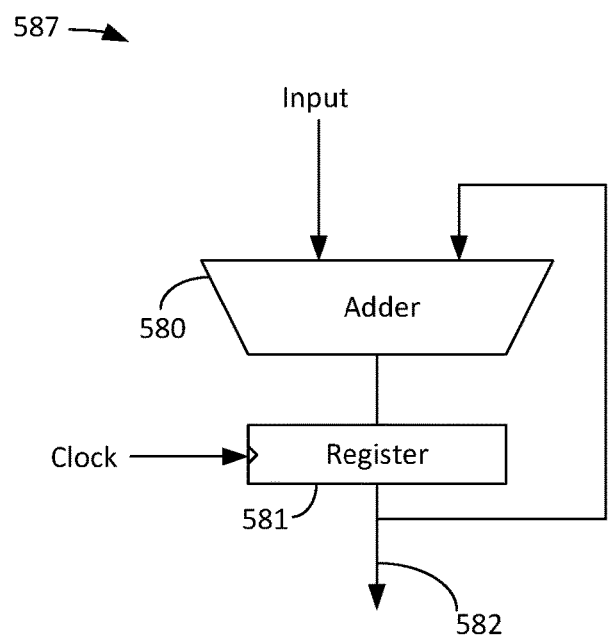
FIG. 5C illustrates an example implementation of an accumulator.

FIG. 5C is an example implementation of an accumulator 587. The accumulator 587 may correspond to any of the accumulators described herein, such as accumulator 520. As shown, the accumulator 520 includes an adder circuit 580 receiving an input signal, as shown. The output of the adder circuit 580 is provided to a register configured to store the output of the adder circuit at each cycle of a clock signal provided to the register 581. The output 582 of the register 581 is used as the output of the accumulator 587, and is fed back to an input of the adder circuit 580, as shown. While FIG. 5C illustrates one example implementation of an accumulator to facilitate understanding, the aspects described herein may be implemented using any suitable accumulator architecture.

Figure 6:
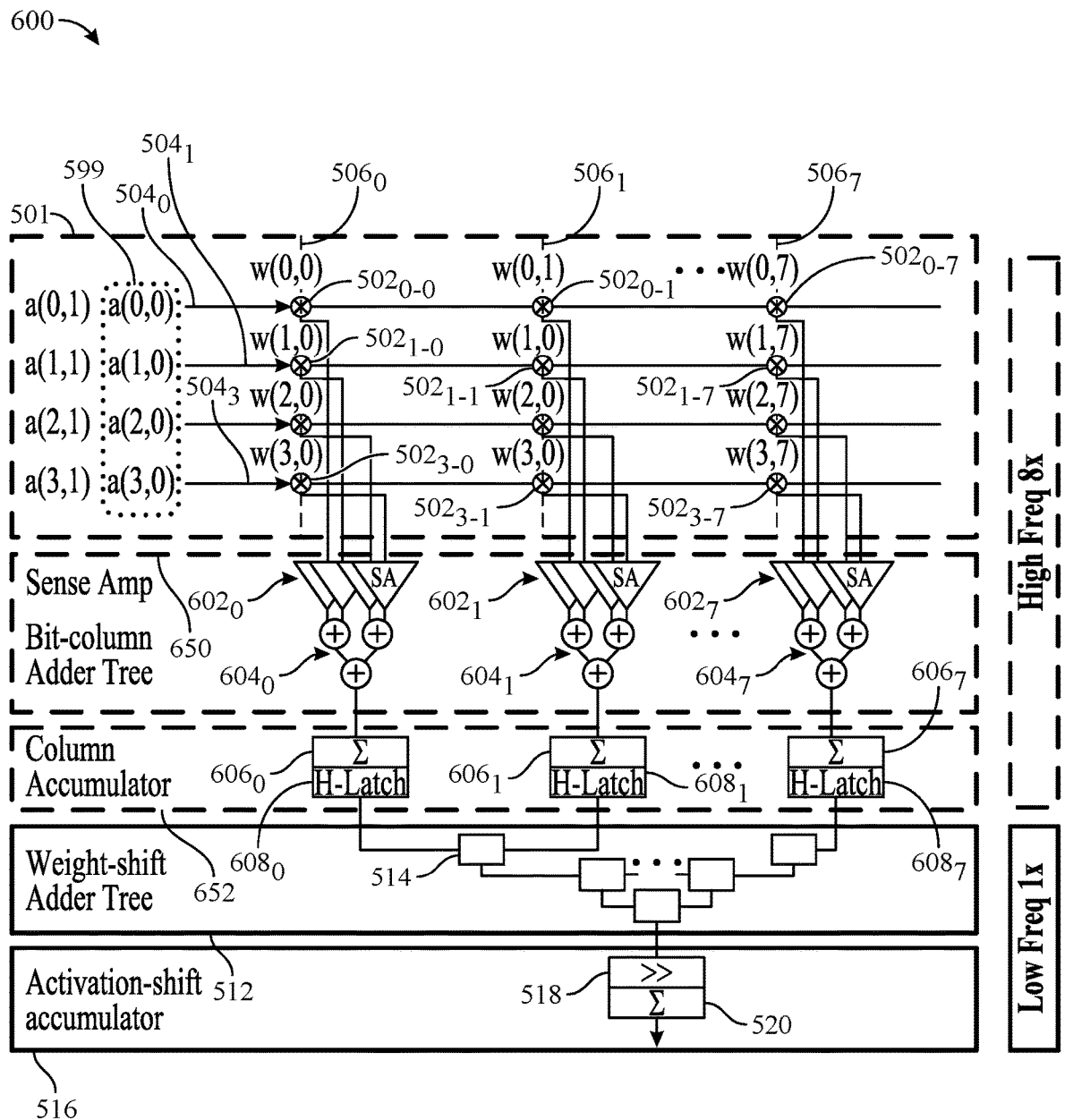
FIG. 6 illustrates a circuit for CIM implemented using a bit-column adder tree, in accordance with certain aspects of the present disclosure.

FIG. 6 illustrates a circuit 600 for CIM implemented using a bit-column adder tree circuit 650 and column accumulator circuit 652, in accordance with certain aspects of the present disclosure. The bit-column adder tree circuit 650 has inputs coupled to outputs of multiple sense amplifiers $602_0$, $602_1$, to $602_7$, that are connected to multiple columns 506, where each column has multiple bit-lines (e.g., RBLs). For example, each of columns 506 may have four bit-lines, each bit-line coupled to an input of one of four sense-amplifiers (e.g., sense amplifiers $602_0$). The word-lines of the CIM array 501 may include multiple word-line groups (e.g., eight groups), each group having four word-lines. Each word-line of each group of four word-lines is coupled to a respective one of four bit-lines on each column. Each group of four word-lines become active by corresponding activation signals in a given computation cycle, while the activation signals of the remaining word-line groups are set to logic low. The word line groups (e.g., eight word-line groups for a total of 32 word-lines in this example) are processed in a total of eight clock cycles. The sense amplifiers $602_0$, $602_1$, to $602_7$ are collectively referred to as sense amplifiers 602. Multiple sense amplifiers (e.g., four) are included for each of columns 506, allowing multiple columns to be sensed concurrently. For example, sense amplifiers $602_0$ concurrently sense the outputs of respective memory cells $502_{0-0}$ to $502_{3-0}$ on column $506_0$, sense amplifiers $602_1$ concurrently sense the outputs of respective memory cells $502_{0-1}$ to $502_{3-1}$ on column $506_1$, and so on to sense amplifiers $602_7$ that concurrently sense the outputs of respective memory cells $502_{0-7}$ to $502_{3-7}$ on column $506_7$. The outputs of sense amplifiers for each column are coupled to an adder tree (e.g., adder trees $604_0$, $604_1$, to $604_7$, collectively referred to as adder trees 604). Each of adder circuits used to implemented each of the adder trees 604 may be implemented as described with respect to FIG. 5B.

For simplicity, each of the sense amplifiers 602 is shown as having an input coupled to an output of a single memory cell. However, the input of each of the sense amplifiers 602 may be coupled to an output of multiple memory cells, which may be activated in a sequential manner. In other words, with four sense amplifiers for each column, four word-lines may be activated on each column at a time. As an example, the inputs of sense amplifiers $602_0$ may be coupled to outputs of respective memory cells for a first group of word-lines (e.g., word-lines $504_0$ to $504_3$) as shown, but also coupled to outputs of respective memory cells for a second group of word-lines (e.g., word-lines $504_4$ to $504_7$), and coupled to outputs of respective memory cells for a third group of word-lines (e.g., word-lines $504_8$ to $504_{11}$), and so on to the last group of word-lines (e.g., word-lines $504_{28}$ to $504_{31}$). Thus, for 32 word-lines and four sense amplifiers per column, eight computation cycles may be used to complete the computations for a set of activation inputs (e.g., activation inputs a(0,0) to a(31,0)).

As described, the outputs of the adder trees 604 are coupled to a column accumulator circuit 652. For example, the outputs of each of the adder trees 604 is coupled to one of accumulators $606_0$, $606_1$, to $606_7$ (collectively referred to as accumulators 606) of the column accumulator circuit 652. Each of accumulators 606 may be implemented as described with respect to FIG. 5C. Each of the accumulators 606 performs accumulation of output signals of a respective one of the adder trees 604 across the multiple computation cycles. For example, during each computation cycle, computation is performed for four word-lines, and output signals of the computations for the four word lines are added using the adder trees 604 of the bit-column adder tree circuit 650. After multiple computation cycles (e.g., eight cycles for 32 word-lines when using four sense amplifiers), each of the accumulators 606 performs accumulation of the output signals of a respective one of the adder trees 604.

Once the multiple computation cycles have been completed, the outputs of the accumulators 606 are provided to the weight-shift adder tree circuit 512 for addition across columns, and the output of the weight-shift adder tree circuit 512 is provided to the activation-shift accumulator circuit 516 for accumulation across activation cycles, as described with respect to FIG. 5A. In other words, bit-wise accumulation occurs at each of the accumulators 606 across multiple computation cycles (e.g., eight computation cycles, each computation cycle being for four word-lines until computation for the 32 word-lines is completed). The weight-shift adder tree circuit 512 combines the eight columns of weighted sums (e.g., providing the accumulation result for a given activation bit position during each activation cycle), and the activation-shift accumulator circuit 516 combines the results from multiple (e.g., eight) activation cycles to output a final accumulation result. In some aspects, the CIM array 501, bit-column adder tree circuit 650, and column accumulator circuit 652 operate at a higher frequency (e.g., by eight times when implemented using eight computation cycles, or less than eight times determined by the limit of critical path delay while still using eight computation cycles) than the weight-shift adder tree circuit 512 and activation-shift accumulator circuit 516. As shown, half latch circuits $608_0$, $608_1$, to $608_7$ (collectively referred to as half latch circuits 608) may be coupled to respective outputs of the accumulators 606. Each half latch circuit holds the output of a respective one of the accumulators 606, and provides the output to a respective input of the weight-shift adder tree circuit 512 once the multiple computations cycles have been completed. In other words, a half latch circuit generally refers to a latch circuit that hold a digital input (e.g., an output of one of accumulators 606) at a beginning of a clock cycle and provides the digital input to an output of the latch circuit at the end of the clock cycle. The half latch circuits 608 facilitate the transition from the higher frequency operation of the column accumulator circuit 652 (e.g., at 8× as shown) to the lower frequency operation of the weight-shift adder tree circuit 512 (e.g., at 1× as shown).

Figure 7:
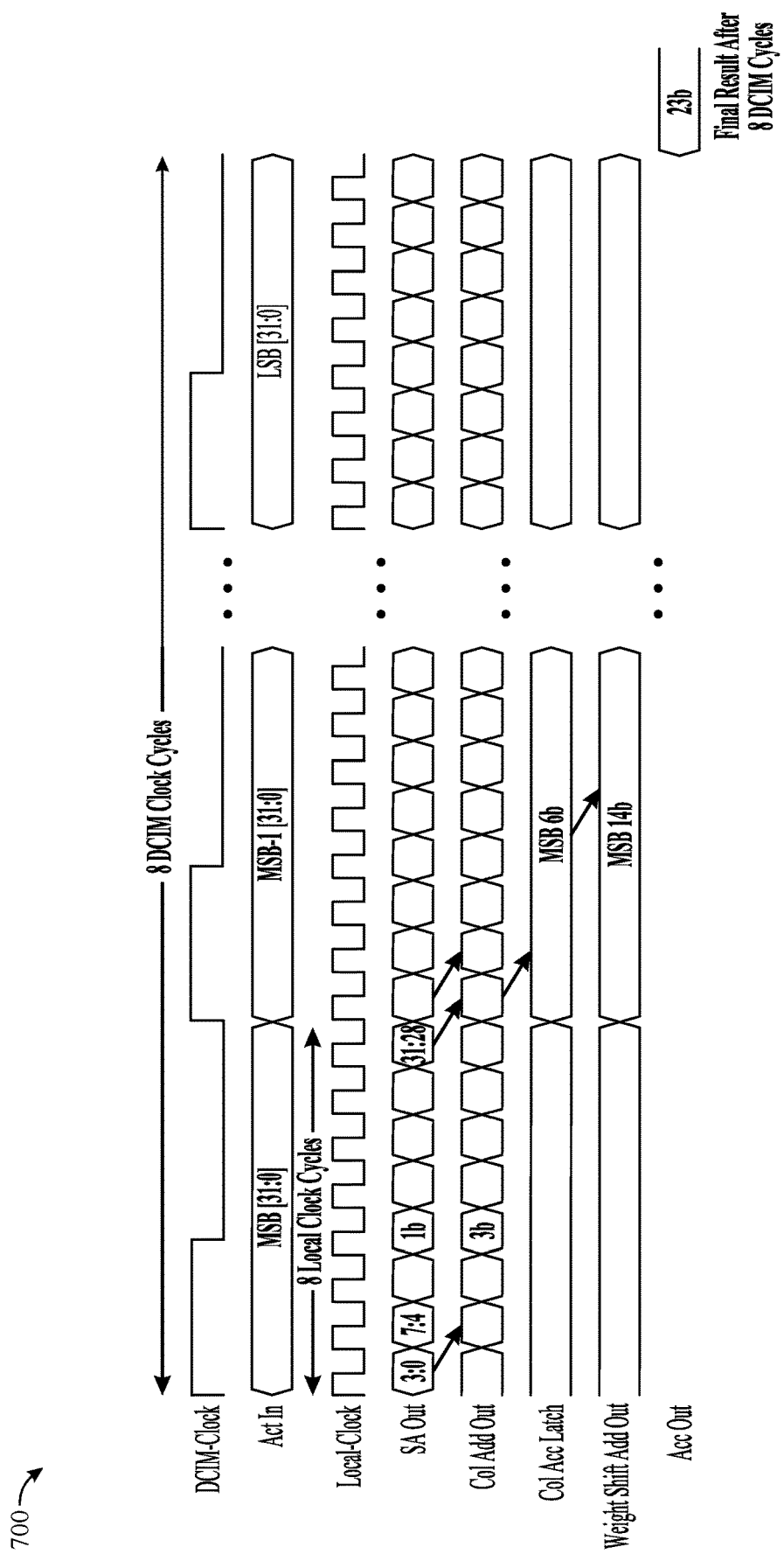
FIG. 7 is a timing diagram illustrating signals associated with the circuit of FIG. 6, in accordance with certain aspects of the present disclosure.

FIG. 7 is a timing diagram 700 illustrating signals associated with the circuit 600, in accordance with certain aspects of the present disclosure. The circuit 600 may operate on a digital compute in memory (DCIM) clock. The DCIM clock may be used as a main clock on which the circuits 500, 600 operate. After eight cycles of the DCIM clock, a final accumulation output may be provided for multiplication of weights with 8-bit activation inputs. As shown, a higher frequency clock signal, referred to as a local clock, may be generated from the lower frequency DCIM clock. For example, the local clock may have a frequency that is eight times greater than a frequency of the DCIM clock.

As shown, one bit of each of the activation inputs is provided during each of the eight cycles of the DCIM clock. For example, bits a(0,0) to a(31,0) (e.g., MSBs of the different activation inputs) are provided to the memory cells during a first activation cycle (e.g., a first cycle of the DCIM clock), bits a(0,1) to a(31,1) (e.g., second MSBs (MSB-1) of the different activation inputs) are provided to the memory cells during a second activation cycle (e.g., a second cycle of DCIM clock), and so on.

During each cycle of the local clock, outputs of the sense amplifiers 602 (labeled "SA Out") and outputs of the adder trees 604 (labeled "Col Add Out") are provided for a computation cycle. During each cycle of the local clock, SA Out and Col Add Out provide an output for memory cells of a subset of the word-lines 504 (e.g., for four word-lines in the example described with respect to FIG. 6). For example, during a first cycle of the local clock, Col Add Out for adder tree $604_0$ is provided for computations performed by memory cells $502_{0\text{-}0}$ to $502_{3\text{-}0}$, during a second cycle of the local clock, Col Add Out is provided for computations performed by memory cells $502_{4\text{-}0}$ to $502_{7\text{-}0}$, and so on until Col Add Out is provided for computations performed by memory cells $502_{28\text{-}0}$ to $502_{31\text{-}0}$ (here, after eight cycles of the local clock).

As shown, the output (labeled "Col Acc Latch") of the column accumulator circuit 652 and the output (labeled "Weight Shift Add Out") of the weight-shift adder tree circuit 512 are provided after the eight local clock cycles (e.g., after a single DCIM clock cycle). The activation-shift accumulator circuit 516 accumulates the Weight Shift Add Out across the eight DCIM clock cycles, and provides an output (labeled "Acc Out") at the end of the eight DCIM clock cycles.

In some aspects, the number of bits associated with the activation inputs and/or the weights may be configurable. The bit-column adder tree circuit 650 allows configurability of the number of bits for weights down to a single-bit. For example, to implement 4-bit weights, circuitry associated with columns $506_4$, $506_5$, $506_6$, $506_7$ may be deactivated, as described in more detail herein.

Figure 8A:
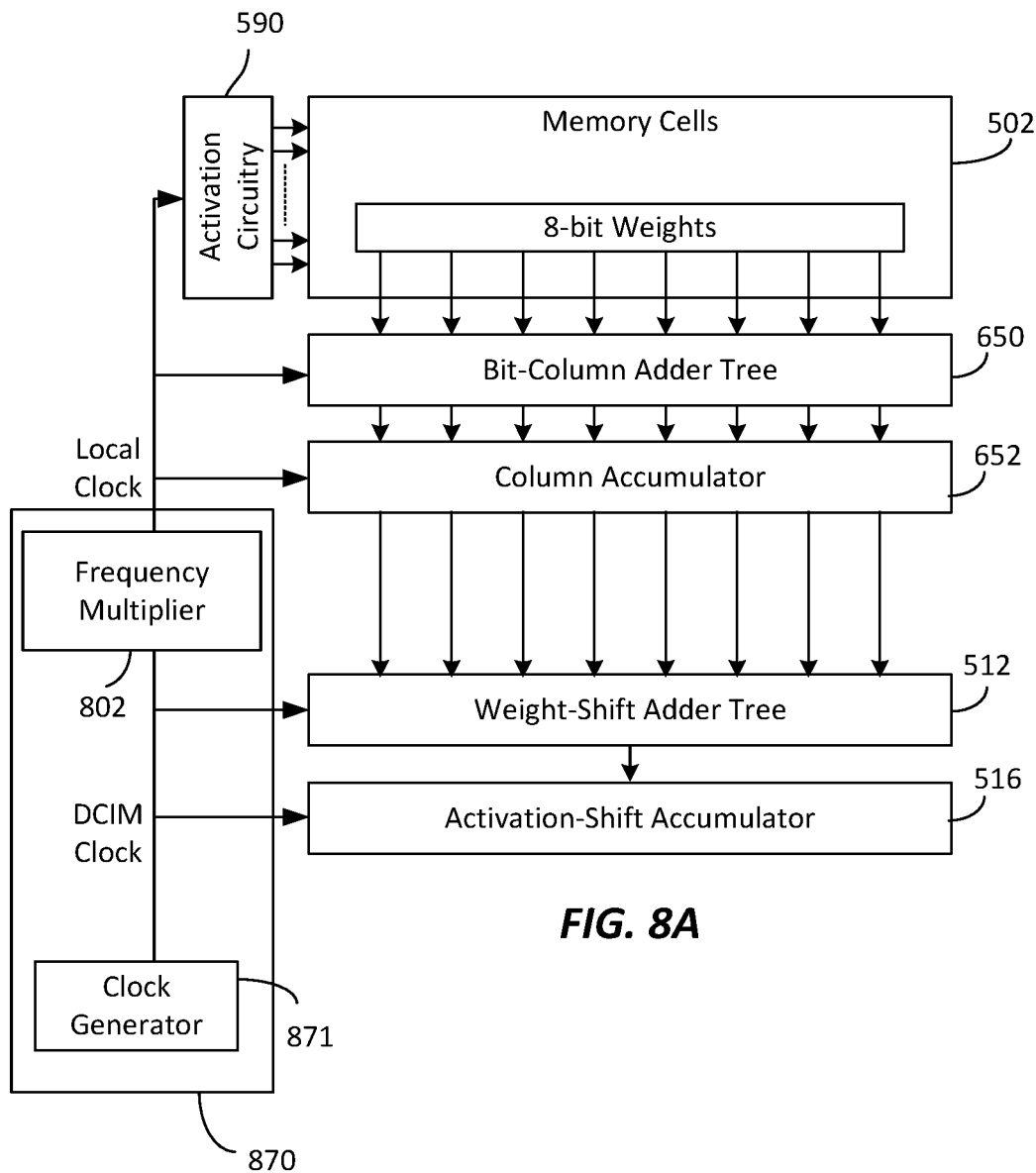
FIGS. 8A, 8B, and 8C are block diagrams illustrating CIM circuitry with configurable bit-size of weights, in accordance with certain aspects of the present disclosure
Figures 8B, 8C:
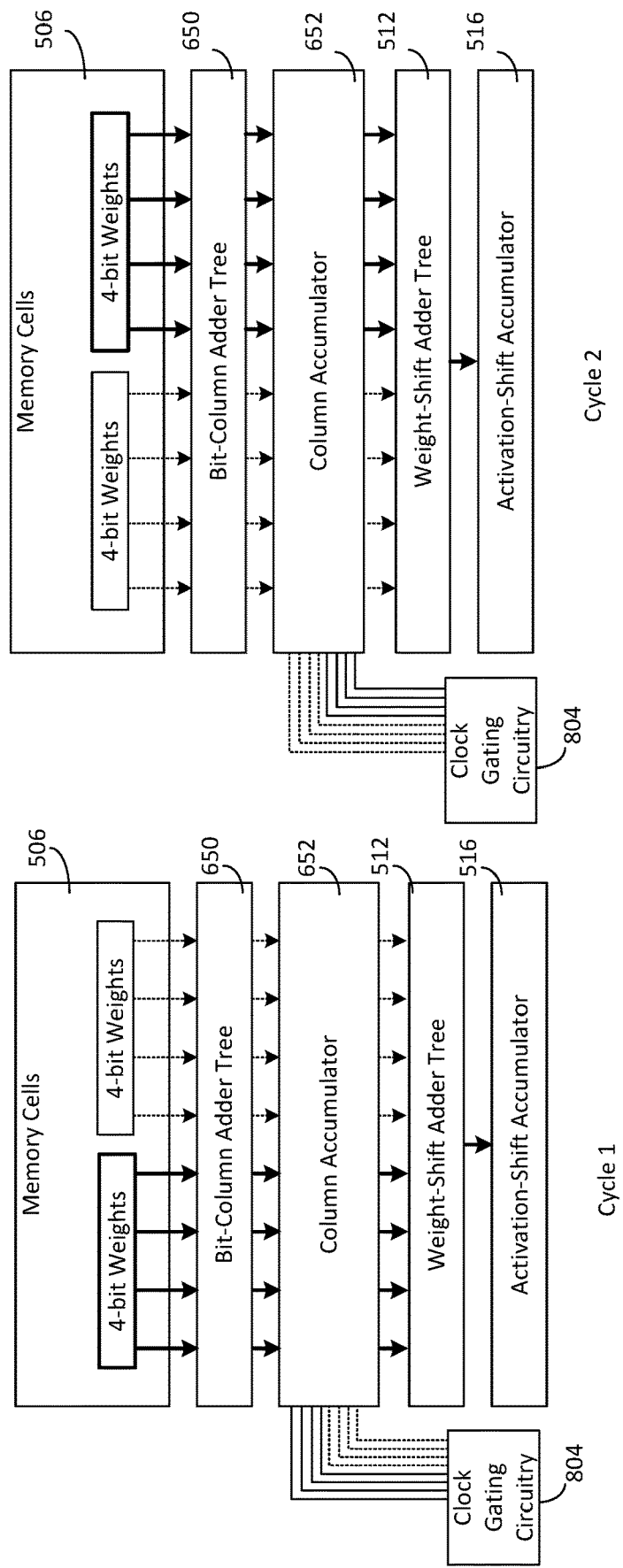

FIGS. 8A, 8B, and 8C are block diagrams illustrating CIM circuitry with configurable bit-size of weights, in accordance with certain aspects of the present disclosure. For example, as shown in FIG. 8A, 8-bit weights may be stored in the memory cells 502, and processed using the bit-column adder tree circuit 650, column accumulator circuit 652, weight-shift adder tree circuit 512, and activation-shift accumulator circuit 516, as described herein.

As shown, a clock generator circuit 870 may include a clock generator 871 configured to generate the DCIM clock. The clock generator 871 may be implemented using any suitable clock generation circuit such as a phase-locked loop (PLL) or ring oscillator. The weight-shift adder tree circuit 512 may receive and operate on the DCIM clock described with respect to FIG. 7. For certain aspects, the clock generator circuit 870 may include a frequency multiplier 802 that may be used to generate the local clock, based on which the activation circuitry 590, the bit-column adder tree circuit 650, and the column accumulator circuit 652 operate. While the frequency multiplier 802 is shown as being part of the clock generator circuit 870, the frequency multiplier 802 may be separate from the clock generator 871 in some implementations. A frequency multiplier generally refers to any circuit that receives a clock signal having a first frequency, and generates a second clock signal having a second different frequency, where the second frequency is a multiple of the first frequency.

Some aspects provide computation techniques using a wing-serial operation, as described with respect to FIGS. 8B and 8C. As used herein, in the case of a CIM circuit, "wing-serial operation" generally refers to operating on one wing (one processing path of the CIM circuit) and then operating on another wing (another processing path of the CIM circuit). For example, four-bit weights may be stored in memory cells on a set of four columns (e.g., columns $506_4$, $506_5$, $506_6$, $506_7$) to be used to perform a first 4-bit weight computation, and four-bit weights may be stored in memory cells on another set of four columns (e.g., columns $506_0$, $506_1$, $506_2$, $506_3$) to be used to perform a second 4-bit weight computation. The two sets of four columns may be disjoint sets. While in the example provided, the 4-bit weight computation is performed for columns $506_4$, $506_5$, $506_6$, $506_7$ before the 4-bit weight computation is performed for columns $506_0$, $506_1$, $506_2$, $506_3$, the computations may be performed in reverse order. For example, the 4-bit weight computation may be performed for columns $506_0$, $506_1$, $506_2$, $506_3$ before the 4-bit weight computation is performed for columns $506_4$, $506_5$, $506_6$, $506_7$.

FIG. 8B shows a first cycle during which the first 4-bit weight computation is performed. During the first cycle, the circuitry of the bit-column adder tree circuit 650 and column accumulator circuit 652 used for processing signals for columns $506_4$, $506_5$, $506_6$, $506_7$ are deactivated. For example, a clock gating circuit 804 may be used to deactivate clocks provided to accumulators $606_4$, $606_5$, $606_6$, $606_7$, during the first cycle to reduce power consumption. As used herein, a clock gating circuit generally refers to any circuit that receives a clock signal (e.g., an AND gate having a first input receiving the clock signal), and provides the clock signal to an output of the circuit in response a control signal (e.g., a control signal provided to a second input of the AND gate being logic high). At the end of the first cycle, the activation-shift accumulator circuit 516 provides the results for the first 4-bit weight computation.

FIG. 8C shows a second cycle during which the second 4-bit weight computation is performed. During the second cycle, circuitry of the bit-column adder tree circuit 650 and column accumulator circuit 652 used for processing signals for columns $506_0$, $506_1$, $506_2$, $506_3$ are deactivated. For example, clock gating circuit 804 may be used to deactivate clocks provided to accumulators $606_0$, $606_1$, $606_2$, $606_3$ during the second cycle to reduce power consumption. While the clock gating technique is only shown for clock signals to the column accumulator circuit 652 to facilitate understanding, the clock gating technique may be used to deactivate clock signals to other circuits that are unused, such as circuitry of the bit-column adder tree.

Example Operations for Digital Computation in Memory (CIM)

FIG. 9 is a flow diagram illustrating example operations 900 for in-memory computation, in accordance with certain aspects of the present disclosure. The operations 900 may be performed by a circuit for CIM, such as the circuit 500 described with respect to FIG. 5A or the circuit 600 described with respect to FIG. 6.

The operations 900 begin at block 905 by the circuit adding, via each of multiple addition circuits (e.g., adder trees 510 or accumulators 606), output signals on a respective one of multiple columns (e.g., columns 506) of a memory. The plurality of memory cells are on each of the multiple columns, and the plurality of memory cells store multiple bits representing weights (e.g., w(0,0) to w(31,7) shown in FIG. 5A) of a neural network. The plurality of memory cells on each of the multiple columns are on different word-lines (e.g., word-lines 504) of the memory.

At block 910, the circuit adds, via a first adder circuit (e.g., weight-shift adder tree circuit 512), output signals of at least two of the multiple addition circuits. At block 915, the circuit accumulates, via an accumulator (e.g., accumulator 520 or activation-shift accumulator circuit 516), output signals of the first adder circuit. In some aspects, the circuit selectively disables one or more portions of the first adder circuit and/or one or more of the multiple addition circuits based on a number of bits associated with each of the weights.

In some aspects, adding the output signals on the respective one of the multiple columns may include accumulating (e.g., via accumulators 606) output signals of the memory cells on the respective one of the multiple columns after two or more of the word-lines are sequentially activated. In some aspects, the circuit adds, via a second adder circuit (e.g., each of the adder trees 604) coupled between each of the multiple addition circuits and the respective one of the multiple columns, output signals of the memory cells that are on the respective one of the multiple columns and the two or more of the word-lines. In some aspects, the circuit senses, via a sense amplifier (e.g., sense amplifiers 602) coupled between the second adder circuit and the respective one of the multiple columns, the output signals of the memory cells that are on the respective one of the multiple columns and the two or more of the word-lines. In this case, the adding via the second adder circuit is based on the sensed output signals.

In some aspects, the circuit disables a first portion of the first adder circuit and/or at least one of the addition circuits during a first computation cycle, and disables a second portion of the first adder circuit and at least another one of the addition circuits during a second computation cycle.

In some aspects, the circuit sequentially activates two or more of the word-lines. In this case, the adding, via each of the multiple addition circuits, output signals on the respective one of multiple columns includes accumulating, via each of the multiple addition circuits (e.g., accumulators 606), output signals of the memory cells on the respective one of the multiple columns after the two or more of the word-lines are sequentially activated.

In some aspects, the adding of the output signals of the at least two of the multiple addition circuits includes performing a bit-shift and addition operation on the at least two of the multiple addition circuits. In some aspects, the circuit generates a first clock signal, where the multiple addition circuits operate based on the first clock signal (e.g., local clock shown in FIG. 7), and the circuit generates a second clock signal, where the first adder circuit operates based on the second clock signal (e.g., DCIM clock shown in FIG. 7), the second clock signal having a different frequency than the first clock signal. In some aspects, the circuit generates, via a frequency multiplier (e.g., frequency multiplier 802), the second clock signal based on the first clock signal.

In some aspects, the circuit sequentially activates the plurality of memory cells based on different activation inputs, and the accumulating of the output signals of the first adder circuit occur after the plurality of memory cells are sequentially activated. For example, sequentially activating the plurality of memory cells may include receiving a first set of the activation inputs (e.g., activation inputs a(0,0) to a(31,0)) during a first activation cycle, receiving a second set of the activation inputs (e.g., activation inputs a(0,1) to a(31,1)) during a second activation cycle, where the accumulating the output signals of the first adder circuit occurs after the first activation cycle and the second activation cycle.

In some aspects, the multiple columns include a first subset of the multiple columns (e.g., columns $506_0$ to $506_3$) and a second subset of the multiple columns (e.g., columns $506_4$ to $506_7$). The first subset may be activated during a first computation cycle (e.g., cycle 1 shown in FIG. 8B). The second subset may be activated during a second computation cycle (e.g., cycle 2 shown in FIG. 8C), the second computation cycle being after the first computation cycle.

In some aspects, the memory cells on each of the word-lines are configured to store one of the weights of the neural network, and a quantity (e.g., four in the example shown in FIG. 8B) of the first subset of the multiple columns is associated with a quantity of bits of the one of the weights. In some aspects, the circuit deactivates, via a clock gating circuit (e.g., clock gating circuit 804), a clock signal associated with processing signals from the second subset of the multiple columns.

Example Processing Systems for Computation in Memory

Figure 10:
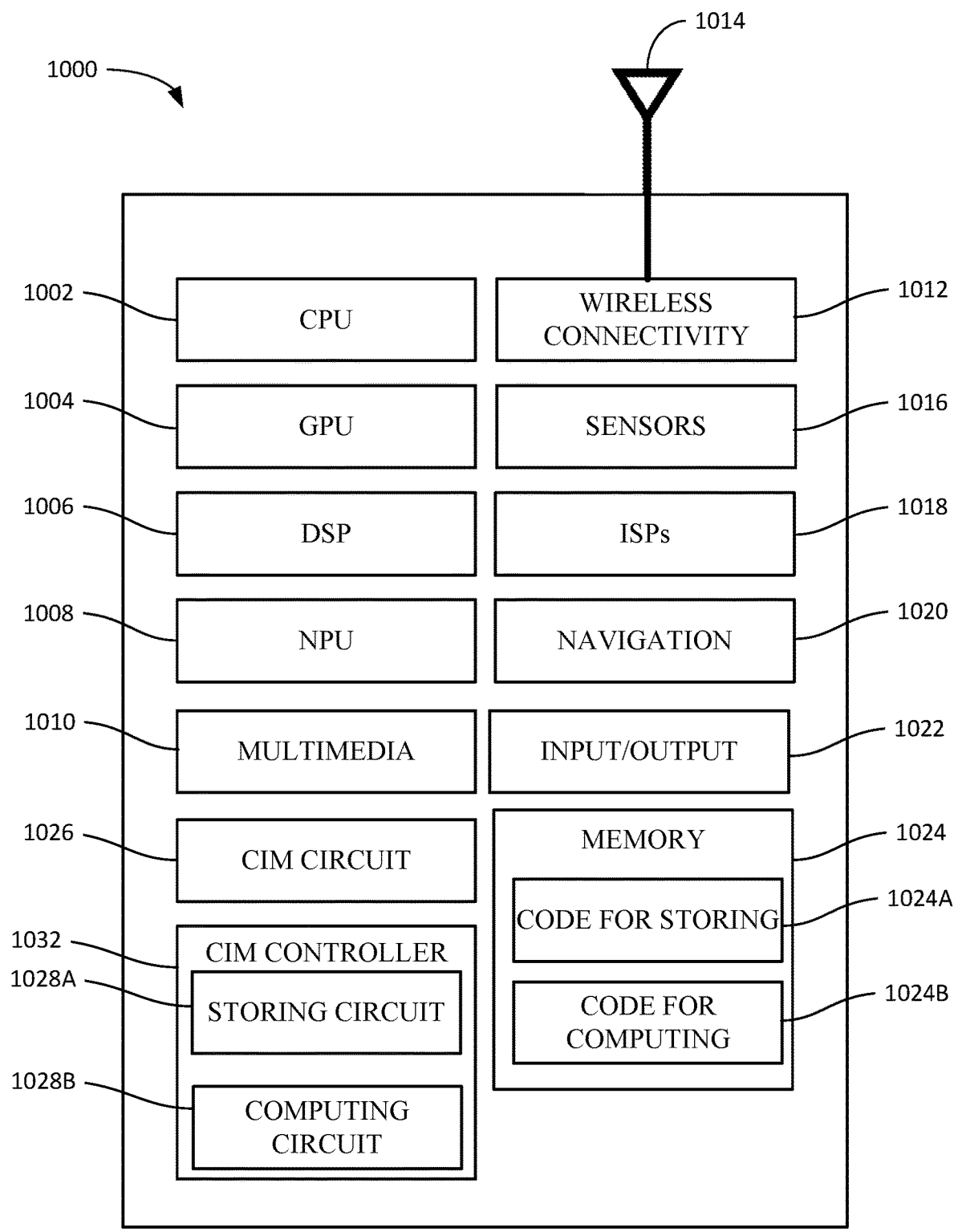
FIG. 10 illustrates an example electronic device configured to perform operations for signal processing in a neural network, in accordance with certain aspects of the present disclosure.

FIG. 10 illustrates an example electronic device 1000. Electronic device 1000 may be configured to perform the methods described herein, including operations 900 described with respect to FIG. 9.

Electronic device 1000 includes a central processing unit (CPU) 1002, which in some aspects may be a multi-core CPU. Instructions executed at the CPU 1002 may be loaded, for example, from a program memory associated with the CPU 1002 or may be loaded from a memory 1024.

Electronic device 1000 also includes additional processing blocks tailored to specific functions, such as a graphics processing unit (GPU) 1004, a digital signal processor (DSP) 1006, a neural processing unit (NPU) 1008, a multimedia processing block 1010, a multimedia processing block 1010, and a wireless connectivity processing block 1012. In one implementation, NPU 1008 is implemented in one or more of CPU 1002, GPU 1004, and/or DSP 1006.

In some aspects, wireless connectivity processing block 1012 may include components, for example, for third generation (3G) connectivity, fourth generation (4G) connectivity (e.g., 4G LTE), fifth generation connectivity (e.g., 5G or NR), Wi-Fi connectivity, Bluetooth connectivity, and wireless data transmission standards. Wireless connectivity processing block 1012 is further connected to one or more antennas 1014 to facilitate wireless communication.

Electronic device 1000 may also include one or more sensor processors 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Electronic device 1000 may also include one or more input and/or output devices 1022, such as screens, touch-sensitive surfaces (including touch-sensitive displays), physical buttons, speakers, microphones, and the like. In some aspects, one or more of the processors of electronic device 1000 may be based on an ARM instruction set.

Electronic device 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of electronic device 1000 or a CIM controller 1032 (also referred to as control circuitry). For example, the electronic device 1000 may include a CIM circuit 1026, such as the circuit 500, as described herein. The CIM circuit 1026 may controlled via the CIM controller 1032. For instance, in some aspects, memory 1024 may include code 1024A for storing (e.g., storing weights in memory cells), code 1024B for computing (e.g., performing a neural network computation by applying activation inputs). As illustrated, the CIM controller 1032 may include a circuit 1028A for storing (e.g., storing weights in memory cells), and a circuit 1028B for computing (e.g., performing a neural network computation by applying activation inputs). The depicted components, and others not depicted, may be configured to perform various aspects of the methods described herein.

In some aspects, such as where the electronic device 1000 is a server device, various aspects may be omitted from the example depicted in FIG. 10, such as one or more of the multimedia processing block 1010, wireless connectivity processing block 1012, antenna 1014, sensor processors 1016, ISPs 1018, or navigation processor 1020.

EXAMPLE CLAUSES

Clause 1. A circuit for in-memory computation, comprising: a plurality of memory cells on each of multiple columns of a memory, the plurality of memory cells being configured to store multiple bits representing weights of a neural network, wherein the plurality of memory cells on each of the multiple columns are on different word-lines of the memory; multiple addition circuits, each coupled to a respective one of the multiple columns; a first adder circuit coupled to outputs of at least two of the multiple addition circuits; and an accumulator coupled to an output of the first adder circuit.

Clause 2. The circuit of clause 1, wherein one or more portions of the first adder circuit are configured to be selectively disabled.

Clause 3. The circuit of any one of clauses 1-2, wherein each of the multiple addition circuits comprises an adder tree coupled to the plurality of memory cells on the respective one of the multiple columns.

Clause 4. The circuit of any one of clauses 1-3, wherein each of the multiple addition circuits comprises another accumulator.

Clause 5. The circuit of any one of clauses 1-4, wherein a first portion of the first adder circuit is configured to be selectively disabled during a first computation cycle, and wherein a second portion of the first adder circuit is configured to be selectively disabled during a second computation cycle.

Clause 6. The circuit of any one of clauses 1-5, further comprising a second adder circuit coupled between each of the multiple addition circuits and the respective one of the multiple columns.

Clause 7. The circuit of clause 6, wherein the second adder circuit comprises an adder tree coupled to two or more of the word-lines.

Clause 8. The circuit of clause 7, wherein the adder tree is configured to add output signals of the memory cells that are on the respective one of the multiple columns and the two or more of the word-lines.

Clause 9. The circuit of clause 6, further comprising a sense amplifier coupled between the second adder circuit and the respective one of the multiple columns.

Clause 10. The circuit of any one of clauses 1-9, wherein the first adder circuit comprises an adder tree configured to add output signals of the at least two of the multiple addition circuits.

Clause 11. The circuit of clause 10, wherein one or more adders of the adder tree comprise a bit-shift and add circuit.

Clause 12. The circuit of any one of clauses 1-11, further comprising a clock generator circuit having a first output configured to output a first clock signal and having a second output configured to output a second clock signal, wherein: the multiple addition circuits are coupled to the first output of the clock generator and are configured to operate based on the first clock signal; and the first adder circuit is coupled to the second output of the clock generator and is configured to operate based on the second clock signal, the second clock signal having a different frequency than the first clock signal.

Clause 13. The circuit of clause 12, wherein the clock generator circuit comprises a frequency multiplier configured to generate the second clock signal based on the first clock signal.

Clause 14. The circuit of any one of clauses 1-13, further comprising a plurality of half latch circuits, each half latch circuit being coupled between the first adder circuit and one of the multiple addition circuits.

Clause 15. The circuit of any one of clauses 1-14, wherein: the plurality of memory cells are configured to be sequentially activated based on different activation inputs; and the accumulator is configured to accumulate output signals of the first adder circuit after the plurality of memory cells are sequentially activated.

Clause 16. The circuit of any one of clauses 1-15, wherein the accumulator is the only accumulator coupled to the output of the first adder circuit.

Clause 17. The circuit of any one of clauses 1-16, wherein: the multiple columns comprise a first subset of the multiple columns and a second subset of the multiple columns; and the first subset is activated during a first computation cycle.

Clause 18. The circuit of clause 17, wherein the second subset is activated during a second computation cycle, the second computation cycle being after the first computation cycle.

Clause 19. The circuit of any one of clauses 17-18, wherein: at least some of the memory cells on each of the word-lines are configured to store one of the weights of the neural network; and a quantity of the first subset of the multiple columns is associated with a quantity of bits of the one of the weights.

Clause 20. The circuit of any one of clauses 17-19, further comprising a clock gating circuit having outputs coupled to the multiple addition circuits and configured to deactivate a clock signal associated with processing signals from the second subset of the multiple columns.

Clause 21. A method for in-memory computation, comprising: adding, via each of multiple addition circuits, output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory; adding, via a first adder circuit, output signals of at least two of the multiple addition circuits; and accumulating, via an accumulator, output signals of the first adder circuit.

Clause 22. The method of clause 21, further comprising selectively disabling one or more portions of the first adder circuit based on a number of bits associated with each of the weights.

Clause 23. The method of any one of clauses 21-22, wherein adding the output signals on the respective one of the multiple columns comprises accumulating output signals of the memory cells on the respective one of the multiple columns after two or more of the word-lines are sequentially activated.

Clause 24. The method of clause 23, further comprising adding, via a second adder circuit coupled between each of the multiple addition circuits and the respective one of the multiple columns, output signals of the memory cells that are on the respective one of the multiple columns and the two or more of the word-lines.

Clause 25. The method of clause 24, further comprising sensing, via a sense amplifier coupled between the second adder circuit and the respective one of the multiple columns, the output signals of the memory cells that are on the respective one of the multiple columns and the two or more of the word-lines, wherein the adding via the second adder circuit is based on the sensed output signals.

Clause 26. The method of any one of clauses 21-25, wherein the adding the output signals of the at least two of the multiple addition circuits comprises performing a bit-shift and addition operation on the at least two of the multiple addition circuits.

Clause 27. The method of any one of clauses 21-26, further comprising: generating a first clock signal, wherein the multiple addition circuits operate based on the first clock signal; and generating a second clock signal, wherein the first adder circuit operates based on the second clock signal, the second clock signal having a different frequency than the first clock signal.

Clause 28. The method of any one of clauses 21-27, further comprising sequentially activating the plurality of memory cells based on different activation inputs, wherein the accumulating the output signals of the first adder circuit occurs after the plurality of memory cells are sequentially activated.

Clause 29. The method of clause 28, wherein sequentially activating the plurality of memory cells comprises: receiving a first set of the activation inputs during a first activation cycle; and receiving a second set of the activation inputs during a second activation cycle, wherein the accumulating the output signals of the first adder circuit occurs after the first activation cycle and the second activation cycle.

Clause 30. An apparatus for in-memory computation, comprising: first means for adding output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory; second means for adding output signals of at least two of the first means for adding; and means for accumulating output signals of the second means for adding.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, means for adding may include an adder tree, such as adder trees 510 or weight-shift adder tree 512, or an accumulator such as accumulators 606. Means for accumulating may include an accumulator such as the activation shift accumulator 516. Means for sensing may include an SA, such as the SAs 602.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A circuit for in-memory computation, comprising:
   a plurality of memory cells on each of multiple columns of a memory, the plurality of memory cells being configured to store multiple bits representing weights of a neural network, wherein the plurality of memory cells on each of the multiple columns are on different word-lines of the memory;
   multiple addition circuits, each coupled to a respective one of the multiple columns;
   a first adder circuit coupled to outputs of at least two of the multiple addition circuits; and
   an accumulator coupled to an output of the first adder circuit,
   wherein one or more portions of the first adder circuit are configured to be selectively disabled.

2. The circuit of claim 1, wherein each of the multiple addition circuits comprises an adder tree coupled to the plurality of memory cells on the respective one of the multiple columns.

3. The circuit of claim 1, wherein each of the multiple addition circuits comprises another accumulator.

4. The circuit of claim 1, wherein a first portion of the first adder circuit is configured to be selectively disabled during a first computation cycle, and wherein a second portion of the first adder circuit is configured to be selectively disabled during a second computation cycle.

5. The circuit of claim 1, further comprising a plurality of second adder circuits, wherein each of the second adder circuits is coupled between a corresponding one of the multiple addition circuits and the respective one of the multiple columns.

6. The circuit of claim 5, wherein each of the second adder circuits comprises an adder tree coupled to two or more of the word-lines.

7. The circuit of claim 6, wherein the adder tree is configured to add output signals of the memory cells that are on the respective one of the multiple columns and the two or more of the word-lines.

8. The circuit of claim 5, further comprising a sense amplifier coupled between each of the second adder circuits and the respective one of the multiple columns.

9. The circuit of claim 1, wherein the first adder circuit comprises an adder tree configured to add output signals of the at least two of the multiple addition circuits.

10. The circuit of claim 9, wherein one or more adders of the adder tree comprise a bit-shift and add circuit.

11. The circuit of claim 1, further comprising a clock generator circuit having a first output configured to output a first clock signal and having a second output configured to output a second clock signal, wherein:
    the multiple addition circuits are coupled to the first output of the clock generator and are configured to operate based on the first clock signal; and
    the first adder circuit is coupled to the second output of the clock generator and is configured to operate based on the second clock signal, the second clock signal having a different frequency than the first clock signal.

12. The circuit of claim 11, wherein the clock generator circuit comprises a frequency multiplier configured to generate the second clock signal based on the first clock signal.

13. The circuit of claim 1, further comprising a plurality of half latch circuits, each half latch circuit being coupled between the first adder circuit and one of the multiple addition circuits.

14. The circuit of claim 1, wherein:
    the plurality of memory cells are configured to be sequentially activated based on different activation inputs; and
    the accumulator is configured to accumulate output signals of the first adder circuit after the plurality of memory cells are sequentially activated.

15. The circuit of claim 1, wherein the accumulator is the only accumulator coupled to the output of the first adder circuit.

16. The circuit of claim 1, wherein:
    the multiple columns comprise a first subset of the multiple columns and a second subset of the multiple columns; and
    the first subset is activated during a first computation cycle.

17. The circuit of claim 16, wherein the second subset is activated during a second computation cycle, the second computation cycle being after the first computation cycle.

18. The circuit of claim 16, wherein:
    at least some of the memory cells on each of the word-lines are configured to store one of the weights of the neural network; and a quantity of the first subset of the multiple columns is associated with a quantity of bits of the one of the weights.

19. The circuit of claim 16, further comprising a clock gating circuit having outputs coupled to the multiple addition circuits and configured to deactivate a clock signal associated with processing signals from the second subset of the multiple columns.

20. A method for in-memory computation, comprising:
adding, via each of multiple addition circuits, output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory;
adding, via a first adder circuit, output signals of at least two of the multiple addition circuits;
accumulating, via an accumulator, output signals of the first adder circuit; and
selectively disabling one or more portions of the first adder circuit based on a number of bits associated with each of the weights.

21. The method of claim 20, wherein adding the output signals on the respective one of the multiple columns comprises accumulating output signals of the memory cells on the respective one of the multiple columns after two or more of the word-lines are sequentially activated.

22. The method of claim 21, further comprising adding, via a plurality of second adder circuits, wherein each of the second adder circuits is coupled between a corresponding one of the multiple addition circuits and the respective one of the multiple columns, output signals of the memory cells that are on the respective one of the multiple columns and the two or more of the word-lines.

23. The method of claim 22, further comprising sensing, via a sense amplifier coupled between each of the second adder circuits and the respective one of the multiple columns, the output signals of the memory cells that are on the respective one of the multiple columns and the two or more of the word-lines, wherein the adding via the second adder circuits is based on the sensed output signals.

24. The method of claim 20, wherein the adding the output signals of the at least two of the multiple addition circuits comprises performing a bit-shift and addition operation on the at least two of the multiple addition circuits.

25. The method of claim 20, further comprising:
generating a first clock signal, wherein the multiple addition circuits operate based on the first clock signal; and
generating a second clock signal, wherein the first adder circuit operates based on the second clock signal, the second clock signal having a different frequency than the first clock signal.

26. The method of claim 20, further comprising sequentially activating the plurality of memory cells based on different activation inputs, wherein the accumulating the output signals of the first adder circuit occurs after the plurality of memory cells are sequentially activated.

27. The method of claim 26, wherein sequentially activating the plurality of memory cells comprises:
receiving a first set of the activation inputs during a first activation cycle; and
receiving a second set of the activation inputs during a second activation cycle, wherein the accumulating the output signals of the first adder circuit occurs after the first activation cycle and the second activation cycle.

28. An apparatus for in-memory computation, comprising:
first means for adding output signals on a respective one of multiple columns of a memory, wherein a plurality of memory cells are on each of the multiple columns, the plurality of memory cells storing multiple bits representing weights of a neural network, wherein the plurality of memory cells on each of the multiple columns are on different word-lines of the memory;
second means for adding output signals of at least two of the first means for adding;
means for accumulating output signals of the second means for adding; and
means for selectively disabling one or more portions of the first adder circuit based on a number of bits associated with each of the weights.

* * * * *